United States Patent
Karaoglu et al.

(10) Patent No.: US 12,307,439 B2
(45) Date of Patent: May 20, 2025

(54) SECURE DIGITAL WALLET PROCESSING SYSTEM

(71) Applicant: Bell Identification B.V., Rotterdam (NL)

(72) Inventors: Sercan Karaoglu, Rotterdam (NL); Mohammed Chakib Bouda, Schiedam (NL)

(73) Assignee: Bell Identification B.V., Rotterdam (NL)

( * ) Notice: Subject to any disclaimer, the term of this patent is extended or adjusted under 35 U.S.C. 154(b) by 526 days.

(21) Appl. No.: 17/285,249

(22) PCT Filed: Oct. 18, 2019

(86) PCT No.: PCT/US2019/057062
§ 371 (c)(1),
(2) Date: Apr. 14, 2021

(87) PCT Pub. No.: WO2020/082020
PCT Pub. Date: Apr. 23, 2020

(65) Prior Publication Data
US 2021/0374724 A1    Dec. 2, 2021

Related U.S. Application Data

(60) Provisional application No. 62/748,340, filed on Oct. 19, 2018.

(51) Int. Cl.
*G06Q 20/36* (2012.01)
*G06Q 20/38* (2012.01)

(52) U.S. Cl.
CPC ....... *G06Q 20/3674* (2013.01); *G06Q 20/363* (2013.01); *G06Q 20/3823* (2013.01);
(Continued)

(58) Field of Classification Search
None
See application file for complete search history.

(56) References Cited

U.S. PATENT DOCUMENTS 10,068,228 B1 * 9/2018 Winklevoss ........... G06Q 20/34
11,139,955 B1 * 10/2021 So ...................... G06Q 20/3674
(Continued)

FOREIGN PATENT DOCUMENTS

CN          103679444         3/2014
CN          107409123 A       11/2017
(Continued)

OTHER PUBLICATIONS

S. Alapati, "Expert Hadoop Administration: Managing, Tuning, and Securing Spark, YARN, and HDFS," United Kingdom, 2016, Pearson Education, chapter 8, excerpt (Year: 2016).*

(Continued)

*Primary Examiner* — Eduardo Castilho
(74) *Attorney, Agent, or Firm* — Kilpatrick Townsend & Stockton LLP

(57) ABSTRACT

Systems and methods for implementing a secure digital wallet processing system. An example method comprises: receiving, by a computer system, a distributed ledger transaction and a public address; retrieving, from a key management system, a private key corresponding to the public address, wherein the key management system comprises a hardware security module (HSM) that generated the public address from the private key; signing the distributed ledger transaction by the private key; and providing the signed distributed ledger transaction to a distributed ledger.

12 Claims, 14 Drawing Sheets

(52) U.S. Cl.
CPC ..... *G06Q 20/3827* (2013.01); *G06Q 20/3829* (2013.01); *G06Q 2220/00* (2013.01)

(56) References Cited

U.S. PATENT DOCUMENTS

| | | | | |
|---|---|---|---|---|
| 11,308,487 | B1* | 4/2022 | Foster | G06Q 20/3829 |
| 11,323,274 | B1* | 5/2022 | Bowen | H04L 9/0897 |
| 11,698,979 | B2* | 7/2023 | Hamel | G06F 21/602 |
| | | | | 713/193 |
| 11,783,323 | B1* | 10/2023 | Winklevoss | G06Q 20/36 |
| 2015/0262176 | A1* | 9/2015 | Langschaedel | G06Q 20/0658 |
| | | | | 705/44 |
| 2015/0287026 | A1* | 10/2015 | Yang | G06Q 20/065 |
| | | | | 705/69 |
| 2015/0324789 | A1* | 11/2015 | Dvorak | G06Q 20/06 |
| | | | | 705/67 |
| 2015/0363772 | A1* | 12/2015 | Ronca | G06Q 20/3829 |
| | | | | 705/71 |
| 2016/0092988 | A1* | 3/2016 | Letourneau | G06Q 20/223 |
| | | | | 705/66 |
| 2016/0292672 | A1* | 10/2016 | Fay | G06Q 20/06 |
| 2016/0344543 | A1* | 11/2016 | Alness | G06Q 20/065 |
| 2016/0350728 | A1 | 12/2016 | Melika et al. | |
| 2017/0316410 | A1* | 11/2017 | Smith | G06Q 20/065 |
| 2017/0372417 | A1 | 12/2017 | Gaddam et al. | |
| 2018/0131517 | A1 | 5/2018 | Block et al. | |
| 2018/0367316 | A1* | 12/2018 | Cheng | G06F 21/52 |
| 2019/0268165 | A1* | 8/2019 | Monica | G06F 21/604 |
| 2019/0280864 | A1* | 9/2019 | Cheng | H04L 9/3247 |
| 2019/0318356 | A1* | 10/2019 | Martin | G06Q 20/401 |
| 2019/0325408 | A1* | 10/2019 | Goroff | G06Q 20/3825 |
| 2019/0356481 | A1* | 11/2019 | Spector | G06Q 20/389 |
| 2020/0013052 | A1* | 1/2020 | Fok | G06Q 20/065 |
| 2020/0028675 | A1* | 1/2020 | Gancarz | G06F 21/85 |
| 2020/0067907 | A1* | 2/2020 | Avetisov | G06F 21/33 |
| 2020/0076606 | A1* | 3/2020 | Burke | H04L 9/3234 |
| 2020/0111080 | A1* | 4/2020 | Metcalfe | G06Q 20/3829 |
| 2020/0118095 | A1* | 4/2020 | Fan | G06Q 20/3674 |
| 2020/0119917 | A1* | 4/2020 | Christensen | H04L 9/3239 |
| 2020/0162246 | A1* | 5/2020 | Schouppe | H04L 9/0894 |
| 2020/0193420 | A1* | 6/2020 | Vogel | G06Q 20/3829 |
| 2020/0344075 | A1* | 10/2020 | Gremaud | H04L 9/0894 |
| 2021/0049591 | A1* | 2/2021 | Lamesh | G06Q 20/3276 |
| 2021/0083872 | A1* | 3/2021 | Desmarais | G06Q 20/3829 |
| 2021/0110390 | A1* | 4/2021 | Janaudy | G06Q 20/4016 |
| 2021/0273814 | A1* | 9/2021 | Lee | G06F 21/33 |
| 2022/0327525 | A1* | 10/2022 | Tsitrin | G06Q 20/36 |

FOREIGN PATENT DOCUMENTS

| | | | | | |
|---|---|---|---|---|---|
| CN | 108369703 | A | | 8/2018 | |
| CN | 108370318 | A | | 8/2018 | |
| CN | 109146481 | * | | 8/2018 | ......... G06Q 20/3829 |
| CN | 108615154 | A | * | 10/2018 | ......... G06Q 20/3825 |
| FR | 3100678 | A1 | * | 3/2021 | ......... G06Q 20/3825 |
| KR | 20190116838 | A | * | 4/2018 | ......... G06Q 20/3823 |
| WO | 2015094326 | A1 | | 6/2015 | |
| WO | WO-2021073953 | A1 | * | 4/2021 | ......... G06Q 20/3674 |

OTHER PUBLICATIONS

W. Kinastowski, "Signing Cloud: Towards Qualified Electronic Signature Service in Cloud," 2013 IEEE 5th International Conference on Cloud Computing Technology and Science, Bristol, UK, 2013, pp. 224-227, doi: 10.1109/CloudCom.2013.135. (Year: 2013).*
L. Zheng and Y. Zhao, "Research on managing private key of PKI users," 2011 International Conference on Mechatronic Science, Electric Engineering and Computer (MEC), Jilin, China, 2011, pp. 2411-2414, doi: 10.1109/MEC.2011.6025979. (Year: 2011).*
NIST—Hardware Security Module (HSM), retrieved from https://web.archive.org/web/20201019084610/https://csrc.nist.gov/glossary/term/Hardware_Security_Module_HSM (Year: 2020).*
Eskandari, Shayan, et al. "A First Look at the Usability of Bitcoin Key Management". Proceedings 2015 Workshop on Usable Security, Internet Society,", 2015, https://doi.org10.14722/usec.2015.23015. USEC 2015. (Year: 2015).*
Pal et al. "Key Management for Blockchain Technology," ICT Express, vol. 7, No. 1, 2021, pp. 76-80, https://doi.org10.1016/j.icte.2019.08.002. Available online Aug. 21, 2019 (Year: 2019).*
Translation of Foreign reference FR3100678A1 (Espacenet) (Year: 2019).*
Voegtlin, "Electrum documentation Release 2.5," retrieved from https://web.archive.org/web/20161206224326/https://media.readthedocs.org/pdf/electrum/latest/electrum.pdf on Dec. 6, 2016 (Year: 2016).*
EPO Machine translation of Foreign Application CN109146481 (Year: 2018).*
Application No. SG11202103833X , Written Opinion, Mailed On Nov. 1, 2022, 9 pages.
Application No. PCT/US2019/057062 , International Search Report and Written Opinion, Mailed On Jan. 10, 2020, 7 pages.
Application No. EP19872361.1 , Extended European Search Report, Mailed On Nov. 17, 2021, 8 pages.
EP19872361.1 , "Intention to Grant", May 9, 2023, 9 pages.
Application No. CN201980068910.4 , Office Action, Mailed On Dec. 6, 2023, with English Translation, 23 pages.
Application No. CN201980068910.4 , Office Action, Mailed On Jul. 3, 2023, with English Translation, 20 pages.
Application No. CN201980068910.4 , Office Action, Mailed On Feb. 28, 2024, 18 pages with English Translation.
Application No. CN201980068910.4 , Office Action, Mailed On Dec. 6, 2023, 23 pages with English Translation.
Wang , "E-Government Planning and Design", National School of Administration Press, Jun. 30, 2013, pp. 218-219.

* cited by examiner

SECURE DIGITAL WALLET PROCESSING SYSTEM

CROSS-REFERENCE TO RELATED APPLICATIONS

This application is a U.S. National Phase of PCT Application No. PCT/US2019/057062 filed Oct. 18, 2019 which claims priority to U.S. Patent Application No. 62/748,340, filed Oct. 19, 2018, the disclosures of which are hereby incorporated in their entirety for all purposes.

TECHNICAL FIELD

The present disclosure is generally related to computer systems, and is more specifically related to systems and methods implementing a secure digital wallet processing system.

BACKGROUND

Software solutions using cryptography and distribution of information, and in particular, various distributed ledger implementations, are getting more traction. Such systems may be employed for cryptocurrency emission, storage, and exchange between users.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Since cryptography will generally stay in the realm of specialization there is a need to decrease its complexity without reducing its security.

Secure digital wallet processing systems and methods described herein address the need for a secure key management protocol for distributed ledger processing systems where the complexity of cryptography is hidden behind easy to integrate application programming interfaces (APIs). The secure digital wallet processing system, for example, may provide financial institutions (e.g., banks) with services to securely manage blockchain transactions for their customers. The secure digital wallet processing system may store one or more types of cryptocurrencies (e.g., Bitcoin, Ethereum, etc.) and allow the buying, selling, transfer, and trading of these cryptocurrencies.

The secure digital wallet processing system may manage cryptography and data segmentation for client processing systems (i.e., clients), such as mobile or desktop computing devices, using distributed ledger processing systems. An example distributed ledger processing system may implement a blockchain, i.e., an immutable (append-only) database in which transaction records are grouped in transaction blocks, such that each block stores a cryptographic hash of the previous block. The transaction blocks are stored by multiple nodes. A consensus protocol may be implemented for validating transaction records. In one example, the blockchain may implement a proof-of-work consensus protocol, which requires that a node, before broadcasting a block of transaction records, compute a value of a cryptographic nonce such that a certain hash function applied to the block would produce a pre-determined result. In various other implementations, other consensus protocols may be employed by systems and methods described herein.

A client may request transactional information to be encrypted by the secure digital wallet processing system and delivered by the secure digital wallet processing system to a distributed ledger or off-chain ledger processing system. Data related to the transaction may be made available via distributed systems (either the ledger itself or a file system) as encrypted and restricted payloads, using internal key management and restriction resources of the secure digital wallet processing system.

Transactional information and its related payloads may be verified and made available to permissioned party's using application programming interfaces (APIs) of the secure digital wallet processing system, or via limited use keys (distributed by the secure digital wallet processing system to secure environments of the client) and direct access of the client to distributed systems.

The client may use this concept to configure key management and restriction features, to influence the accessibility of transactional information and its related data during operation.

Figure 1A:
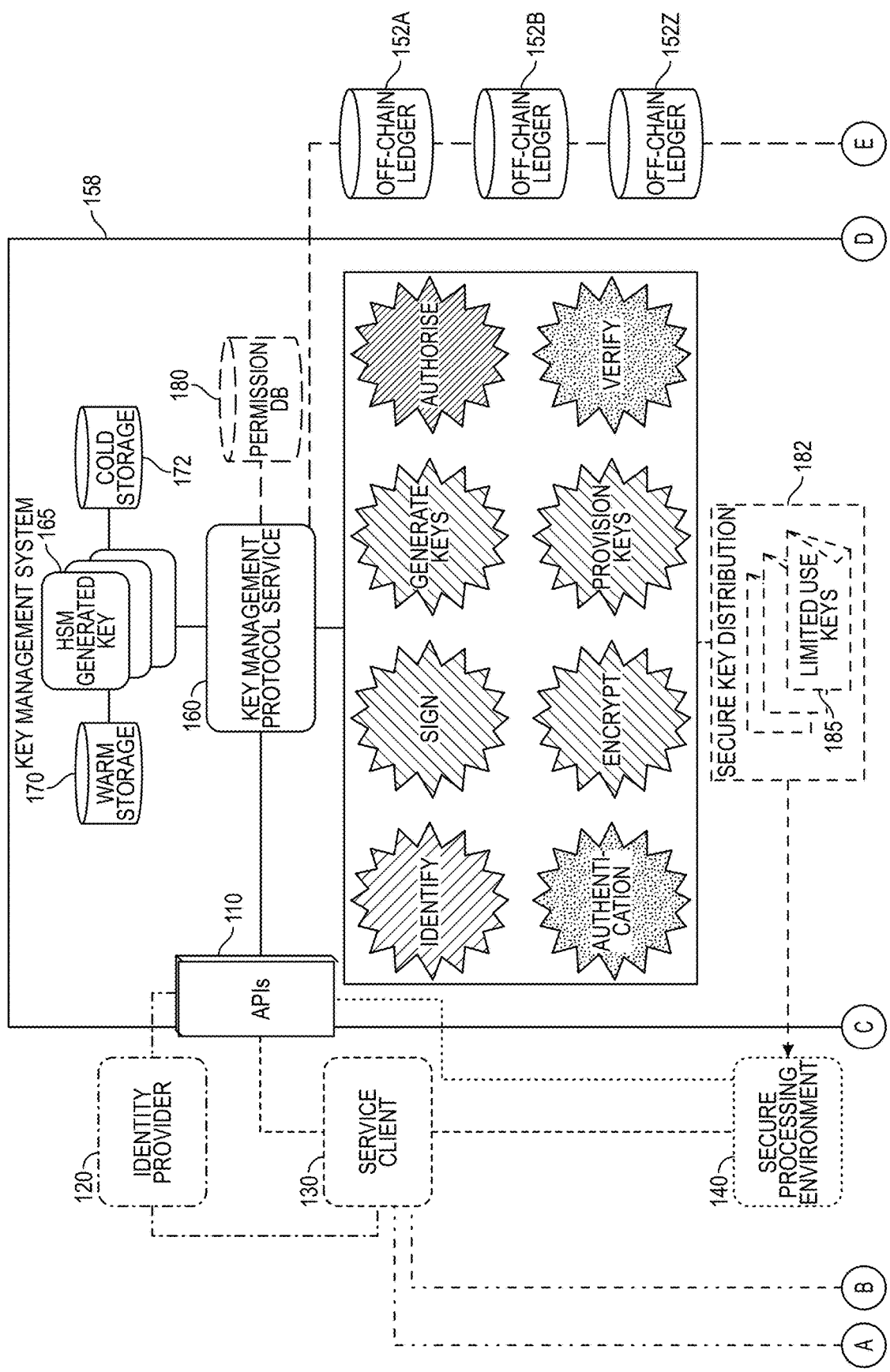
FIGS. 1A and 1B schematically illustrate a component diagram of an example secure digital wallet processing system performing the functions described herein.
Figure 1B:
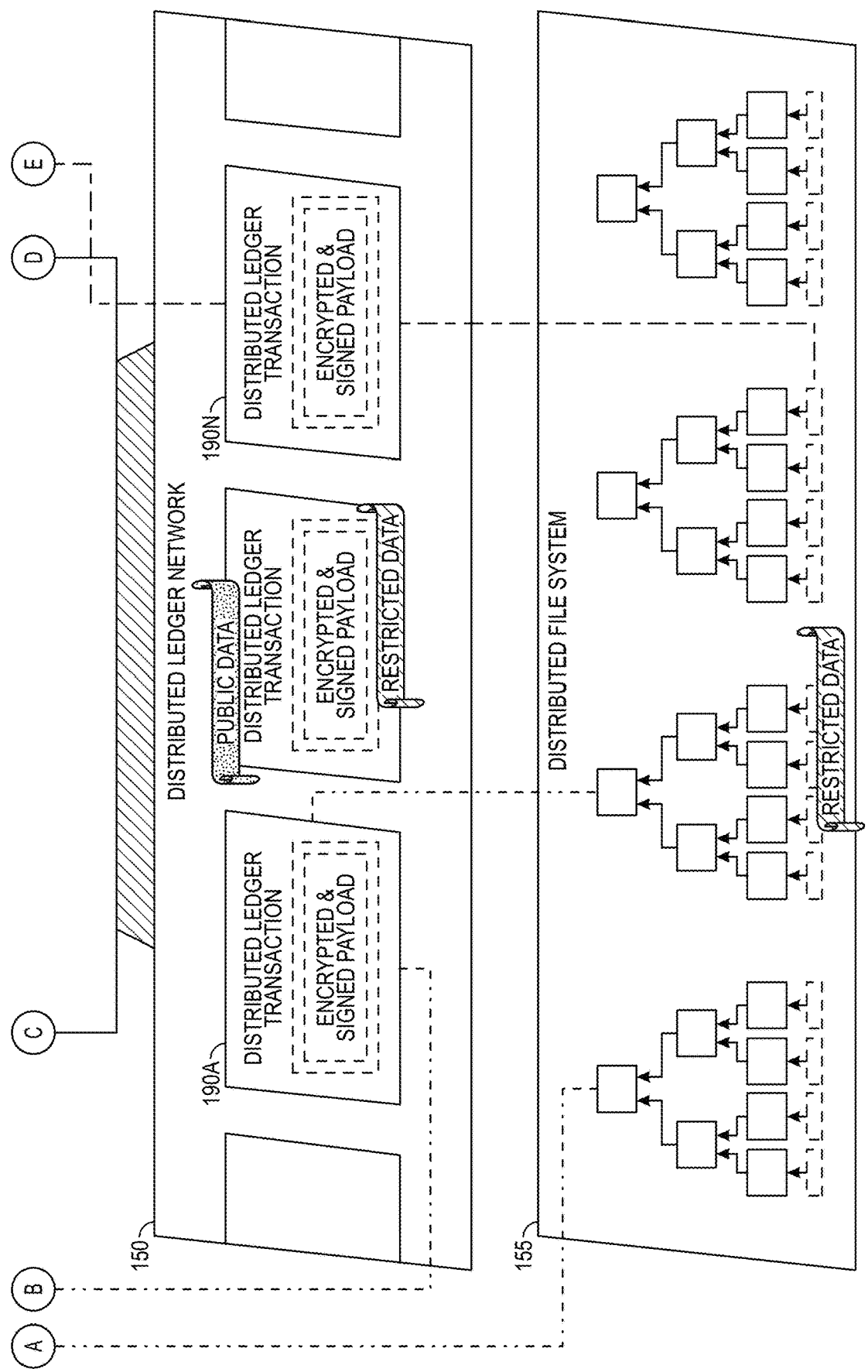

FIGS. 1A and 1B schematically illustrate a component diagram of an example secure digital wallet processing system performing the functions described herein. The secure digital wallet processing system 100 provides APIs 110 to one or more identity provider processing systems 120 (e.g., financial institution processing system), one or more service client processing systems 130 (e.g., processing systems of customers the financial institutions), and one or more secure processing environments 140 of the service client processing systems. The APIs may be web service APIs accessible over a computer network and may conform to the Open API standard.

The secure digital wallet processing system 100 services transactions from the client processing systems using a distributed ledger network 150 of distributed ledger processing systems, off-chain ledger processing systems 152, and/or distributed file system processing systems 155. To do so, the key management system 158 provides a key management protocol service 160 that provides identify, authentication, digital signature, key generation and provisioning, authorization, and verification services to the client processing systems including multi-tenancy support.

The key management protocol service 160 operates using one or more hardware security modules (HSMs), also known as Tamper Resistant Devices (TRDs), that generate and store cryptographic information such as public and private keys 165 or addresses in a secure manner. The HSMs use warm storage devices 170 and cold storage devices 172 to manage the security of the cryptographic information. The warm and cold storage devices store private digital assets (e.g., public and private keys and/or addresses) of users of the client processing systems. Cold storage devices 172 store the cryptographic information while it is not in use by the HSMs, and the cryptographic information is moved from the cold storage devices 172 to the warm storage devices 170 to allow the HSMs to perform cryptographic operations on the cryptographic information. The key management protocol service 160 manages the transfer of cryptographic information between warm storage 170 and cold storage 172 and performs life cycle management of cryptographic keys stored 165 in the warm storage 170 and cold storage 172.

The key management protocol service 160 also operates using a permissions database 180 that stores client permissions of the service client processing systems and uses the client permissions in key management operations and transactions to restrict the use of the operations and transactions as specified by the permission. The key management protocol service 160 creates, updates, and delete permissions stored in the permissions database 180.

The key management protocol service may employ the secure key distribution module 182 for providing limited use cryptographic keys 185 to the secure processing environments 140 of the service client processing systems for use by the service client processing systems with the distributed ledger network 150 of distributed ledger processing systems, the off-chain ledger processing systems 152, and/or the distributed file system processing systems 155. The key management protocol service 160 performs life cycle management of the limited use keys 185 including the provisioning and replenishment of these keys.

The secure digital wallet processing system 100 may further provide distributed ledger network integration services to allow communication between the secure digital wallet processing system and one or more private or public distributed ledger networks 150 of distributed ledger processing systems. These integration services may be used by the service client processing systems 130 to perform transactions on the various distributed ledger processing systems.

The secure digital wallet processing system 100 may further provide off-chain network integration services to allow communication between the secure digital wallet processing system 100 and one or more private or public off-chain ledger networks 152A-152Z of off-chain processing systems. These integration services may be used by the service client processing systems 130 to perform transactions on the various off-chain processing systems 152.

The secure digital wallet processing system 100 may further provide distributed file system integration services to allow communication between the secure digital wallet processing system 100 and one or more private or public distributed file systems 155. These integration services may be used by the service client processing systems to perform transactions on the various distributed file systems.

The key management protocol service 160 creates transactions or asset data 190 responsive to requests from the service client processing systems 130. The key management protocol service 160 may create the transactions or asset data 190A-190N with public data only, with public and private data, with private (encrypted) data on a distributed ledger processing system 150, with private data on a distributed file system 155, with private data on an off-chain ledger, or with any suitable combinations of the above. For example, the key management protocol service 160 may ensure the privacy of transaction data by encrypting the data with an encryption key before submitting the transaction to a distributed ledger processing system 150.

The key management protocol service 160 may also verify or access transactions or asset data 190A-190N responsive to requests from the service client processing systems 130.

Figure 2:
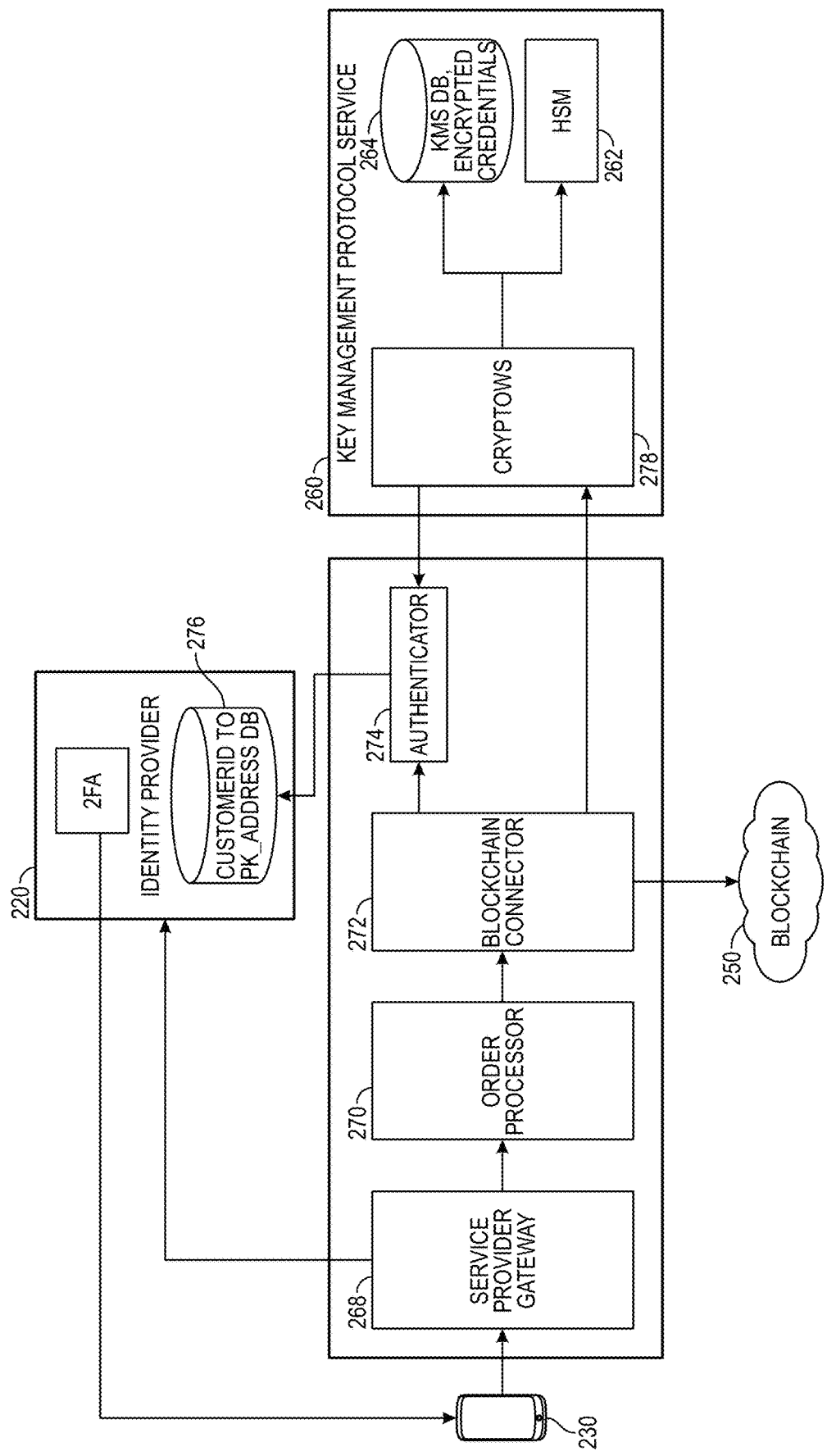
FIG. 2 schematically illustrates a component diagram of an example secure digital wallet processing system performing the functions described herein.

FIG. 2 schematically illustrates a component diagram of another example secure digital wallet processing system performing the functions described herein. The secure digital wallet processing system 200 provides APIs 210 to one or more identity provider processing systems 220 (e.g., financial institution processing system) and one or more service client processing systems 230 (e.g., processing systems of customers the financial institutions, shown as a mobile device in FIG. 2).

The secure digital wallet processing system 220 services transactions from the client processing systems using a block chain network 250 of distributed ledger processing systems. To do so, the secure digital wallet processing system 220 provides a key management protocol service 260 that provides identify, authentication, digital signature, key generation and provisioning, authorization, and verification services to the client processing systems 230 including multi-tenancy support.

The key management protocol service 260 operates using one or more HSMs 262 that generate and store cryptographic information such as public and private keys or addresses in a secure manner. The HSMs 262 store the cryptographic information in a key management system (KMS) database (DB) 264 that includes warm and cold storage devices as described above with reference to FIGS. 1A and 1B.

The secure digital wallet processing system 200 stores cryptocurrency private keys in the KMS DB 264 and uses the private keys to generate one or more public addresses to provide to the service client processing system 230. The service provider gateway 268 receives a create public address request with an authentication token and a customer identifier and forwards the request to the order processor 270. The order processor 270 causes the blockchain connector 272 validate the customer using the authenticator 274, which accesses a customer identifier public address database 276 on the identity provider processing system 220 (or another suitable processing system not shown) to do so. If the customer is successfully validated, the blockchain connector 272 requests a public address for the customer from the CryptoWs service 278. The CryptoWs service 278 causes the HSM 262 to retrieve the customer's private key from the KMS database 264, generates a public address from the private key using a cryptographic operation, stores the public address with the private key in the KMS database 264, and provides the public address to the blockchain connector 272. The blockchain connector 272 stores the public address in the customer identifier public address database 276 of the identity provider processing system 220 and provides the public address to the service client processing system 230.

The secure digital wallet processing system 200 creates transactions for a customer using the public address. The service provider gateway 268 receives a transaction request with an authentication token and a customer identifier and forwards the request to the order processor 270. The order processor 270 causes the blockchain connector 272 validate the customer using the authenticator as described above. If the customer is successfully validated, the blockchain connector 272 requests a transaction to be created for the customer by the CryptoWs service 278. The CryptoWs service causes 278 the HSM 262 to retrieve the customer's private key from the KMS database 264, generates a transaction by signing the transaction with the private key using a cryptographic operation, and returns the signed transaction to the blockchain connector 272. The blockchain connector 272 provides the signed transaction to the blockchain network 250 thus causing the transaction to be executed. The transaction may be a buy order, a sell order, or a transfer to or from another party, for example, and may include computer executable code (e.g., a Smart Contract) that specifies conditions for the transaction.

All or selected features of the secure digital wallet processing system embodiment of FIGS. 1A and 1B may be incorporated into the secure digital wallet processing system embodiment of FIG. 2. Likewise, all or selected features of the secure digital wallet processing system embodiment of FIG. 2 may be incorporated into the secure digital wallet processing system embodiment of FIG. 2.

Figure 3:
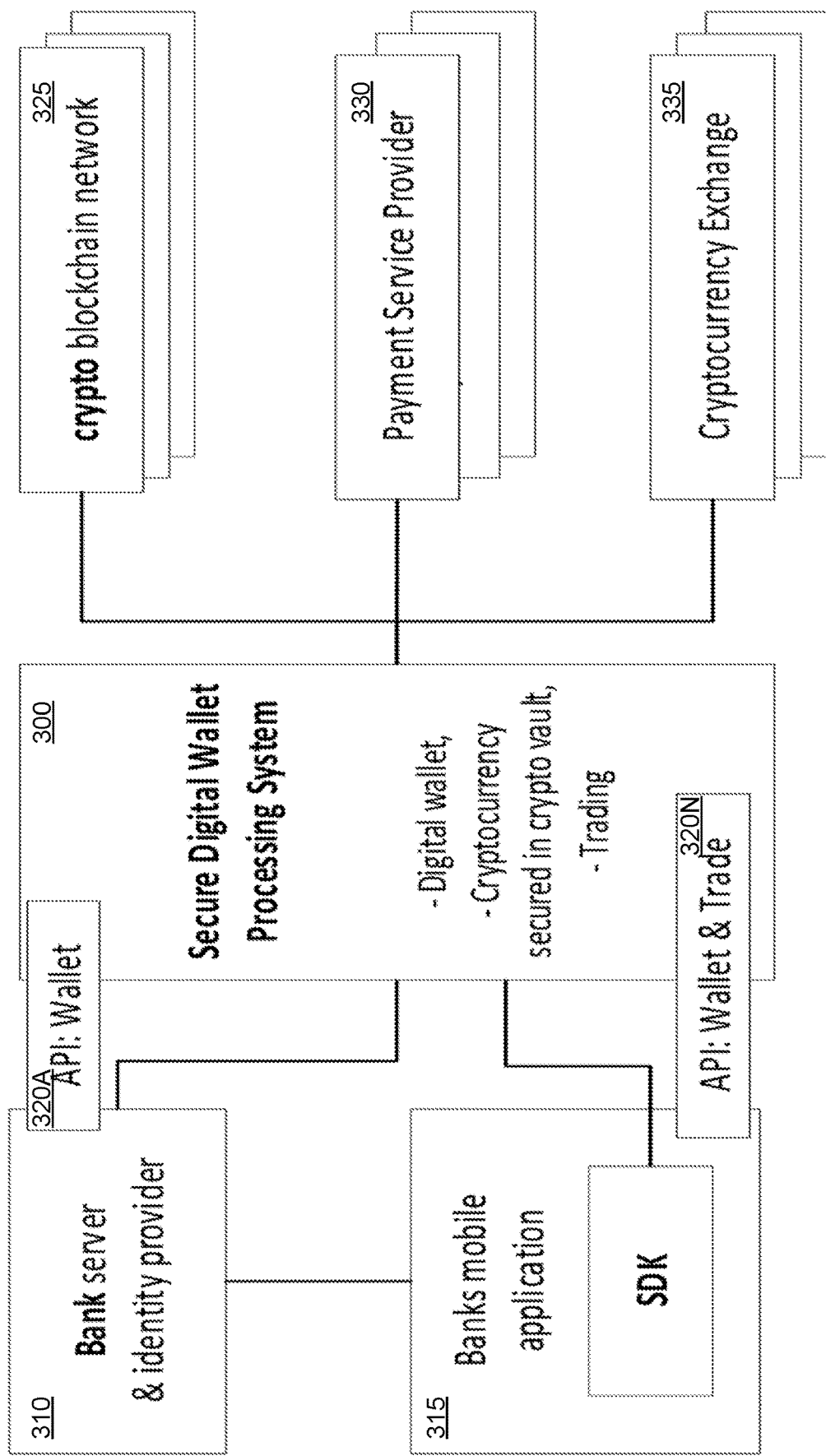
FIG. 3 schematically illustrates a component diagram of another example secure digital wallet processing system performing the functions described herein.

FIG. 3 schematically illustrates a component diagram of another example secure digital wallet processing system performing the functions described herein. The secure digital wallet processing system 300 communicates with a bank server and identify provider processing system 310 and a bank mobile application processing system 315 through APIs 320A-320N. The secure digital wallet processing system 300 also communicates with one or more crypto blockchain networks 325, one or more payment service providers 330, and one or more cryptocurrency exchanges 335.

The secure digital wallet processing system 300 is a solution that provides consumers of banks or merchants with a digital wallet, capable of holding multiple crypto currencies, which are secured in a crypto vault and can be used for trading. The solution supports multiple blockchain networks and exchanges.

Cryptocurrency account(s) and trading functionality can be used via the consumer's banking application 315. When a consumer indicates they want to use the cryptocurrency features, they can start trading using supported crypto currencies for which the cryptographic material is securely stored in the crypto vault.

All or selected features of the secure digital wallet processing system embodiments of FIGS. 1 and/or 2 may be incorporated into the secure digital wallet processing system embodiment of FIG. 3. Likewise, all or selected features of the secure digital wallet processing system embodiment of FIG. 3 may be incorporated into the secure digital wallet processing system embodiments of FIGS. 1 and/or 2.

Figure 4:
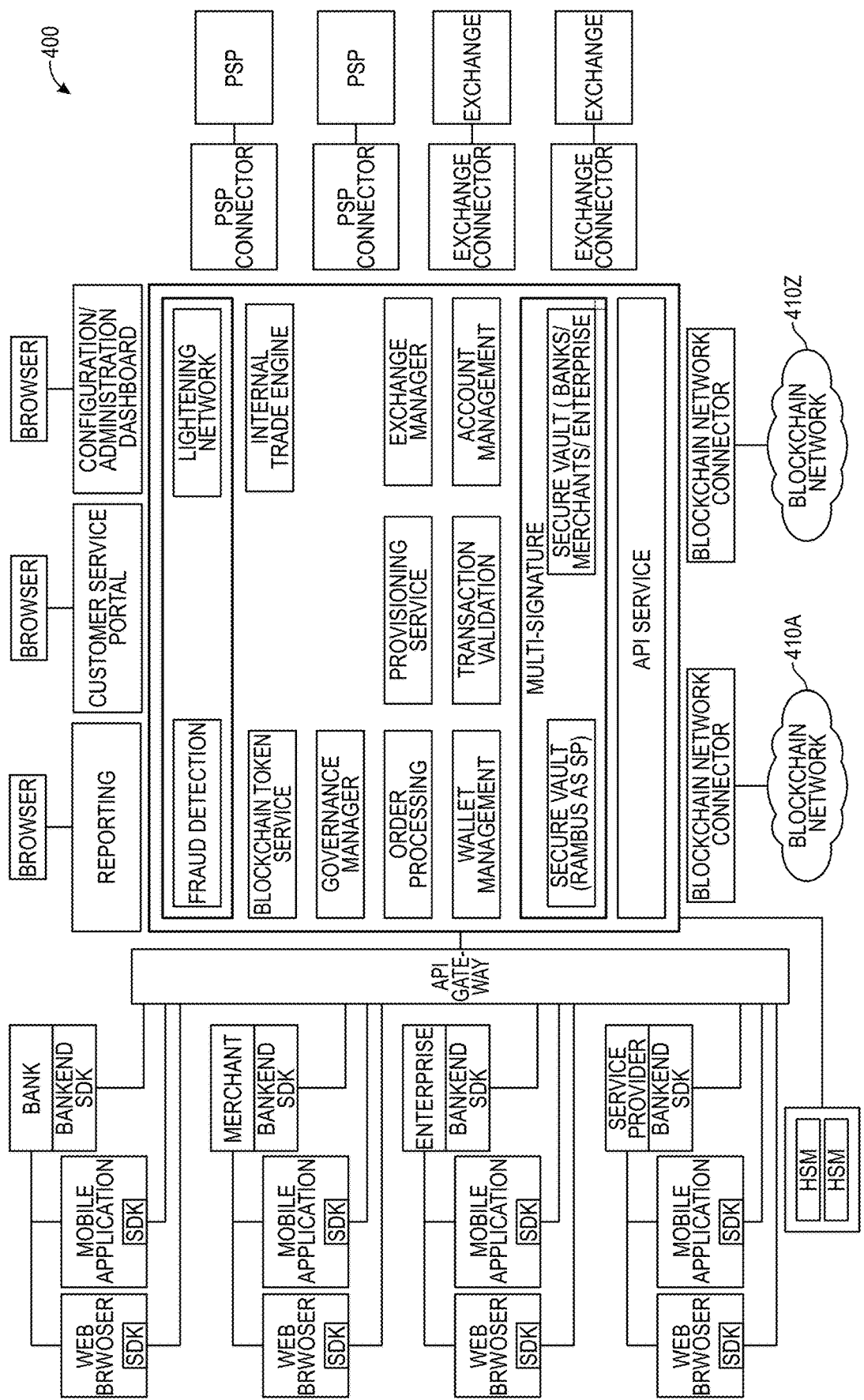
FIG. 4 schematically illustrates a component diagram of another example secure digital wallet processing system performing the functions described herein.

FIG. 4 schematically illustrates a component diagram of another example secure digital wallet processing system performing the functions described herein. The secure digital wallet processing system 400 stores computer executable instructions to provide the following services to a consumer processing system: create a new consumer, automatically create funding accounts, get details of a consumer (e.g., fiat and cryptocurrency account details and/or payment methods), create a new cryptocurrency account, get details of a new account, create a new payment method, update and verify a new payment method, create a cryptocurrency buy order using either a fiat currency or another cryptocurrency, create a cryptocurrency sell order and receive either a fiat currency or another cryptocurrency in return, get order information for one or more orders, transfer a cryptocurrency to or from another party, and get cryptocurrency exchange information (e.g., cryptocurrency tickers). The secure digital wallet processing system 400 also stores computer executable instructions to retrieve definitions such as exchanges, assets, and asset pairs. The secure digital wallet processing system further stores computer executable instructions to provide the following interface services to one or more cryptocurrency networks 410A-410Z (e.g., Ethereum, Bitcoin, etc.).

All or selected features of the secure digital wallet processing system embodiments of FIGS. 1, 2, and/or 3 may be incorporated into the secure digital wallet processing system embodiment of FIG. 4. Likewise, all or selected features of the secure digital wallet processing system embodiment of FIG. 4 may be incorporated into the secure digital wallet processing system embodiments of FIGS. 1, 2, and/or 3.

Various embodiments of secure digital wallet processing systems are described above. Variations of each of the embodiments are possible and contemplated. In addition, all or selected features of one embodiment may be incorporated into other embodiments.

The embodiments of a secure digital wallet processing system described above enable the secure storage and transfer of cryptocurrencies and other digital assets using proven, bank-grade, field-deployed tokenization and encryption technology. These secure digital wallet processing system enables banks, exchanges and investment portals to leverage tokens to secure the purchase, storage, exchange and sale of cryptocurrencies.

Blockchain is gaining increased traction across industries with the decentralized public-ledger framework opening new use cases daily, extending beyond cryptocurrency into financial services, retail, real estate, healthcare and insurance. While it provides a trusted and immutable record, the blockchain is not completely secure. Blockchain stores assets of value, like cryptocurrency, at an address in a public ledger using a private key. Much like a card or account number to access funds, that key is all that is required to access that digital asset, and if it is lost or stolen, that value is gone. Multi-signature enhances the level of security by introducing additional distributed keys for recovery and authentication of transactions, but still relies upon the use of original keys that are vulnerable to attack. Given the highvalue financial and safety-critical nature of some proposed use cases, it is imperative that nothing alters data prior to its placement on the blockchain.

The secure digital wallet processing systems combine multi-signature with proven, bank-grade tokenization technology to enhance security, confidentiality and privacy by replacing sensitive credentials—such as private keys for blockchain and cryptocurrency—with a non-sensitive equivalent token that is unique to each transaction. Unlike the private keys used to authorize cryptocurrency transactions, tokens cannot be used by a third party to conduct transactions if intercepted. By replacing sensitive private keys with a limited use token that can include domain controls for device or channel, tokenization mitigates fraud risk and protects the underlying value of credentials. This reduces cryptocurrency security risks, which have led to enormous losses, adverse brand impact and suspensions of trading.

Designed for cryptocurrencies and other use cases, the secure digital wallet processing systems features include:

Tokenized Security—Replace sensitive private keys with domain-specific tokens to purchase, trade and store cryptocurrency to limit vulnerabilities and improved trust.

Multi-Signature—Multi-signature wallets require at least two signatures to confirm a transaction, increasing security and preventing fraud, while enabling faster transactions.

Segregated Wallets—Combine the security benefits of an offline cold wallet with the convenience of an online wallet through multi-factor authenticated access to an online segregated wallet.

The secure digital wallet processing systems can support a white-label application (app) or a software development kit (SDK), allowing consumers to easily access and trade cryptocurrency through their usual mobile and desktop banking portals.

Figure 5:
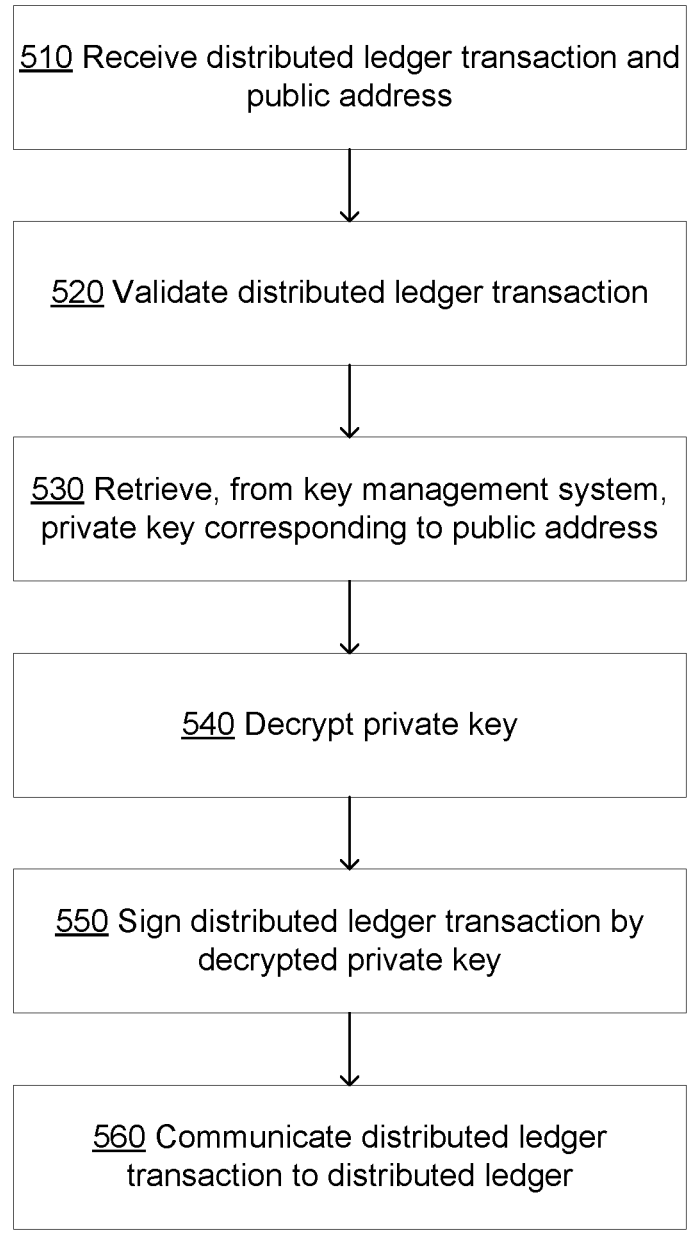
FIG. 5 depicts a flow diagram of one illustrative example of method of implementing a secure digital wallet, in accordance with one or more aspects of the present disclosure.

FIG. 5 depicts a flow diagram of one illustrative example of method 500 of implementing a secure digital wallet, in accordance with one or more aspects of the present disclosure. Method 500 and/or each of its individual functions, routines, subroutines, or operations may be performed by one or more general purpose or specialized computer systems (e.g., example computer system 1000 of FIG. 13). In some implementations, method 500 may be performed by a single processing thread. Alternatively, method 500 may be performed by two or more processing threads, each thread executing one or more individual functions, routines, subroutines, or operations of the method. In some implementations, the processing threads implementing method 500 may be synchronized (e.g., using semaphores, critical sections, and/or other thread synchronization mechanisms).

At block 510, the computer system implementing the method receives a distributed ledger transaction and a public address identifying the user initiating the transaction. In various examples, the distributed ledger transaction is a cryptocurrency buy or sell order, a cryptocurrency transfer to another public address of the same user, or a code implementing a smart contract.

At block 520, the computer system validates the distributed ledger transaction.

Responsive to successfully validating the transaction, the computer system, at block 530, retrieves, from the key management system, the private key corresponding to the public address.

At block 540, the computer system decrypts the retrieved private key.

At block 550, the computer system signs the distributed ledger transaction by the decrypted private key.

At block 560, the computer system communicates the signed distributed ledger transaction to a distributed ledger, and the method terminates.

Figure 6:
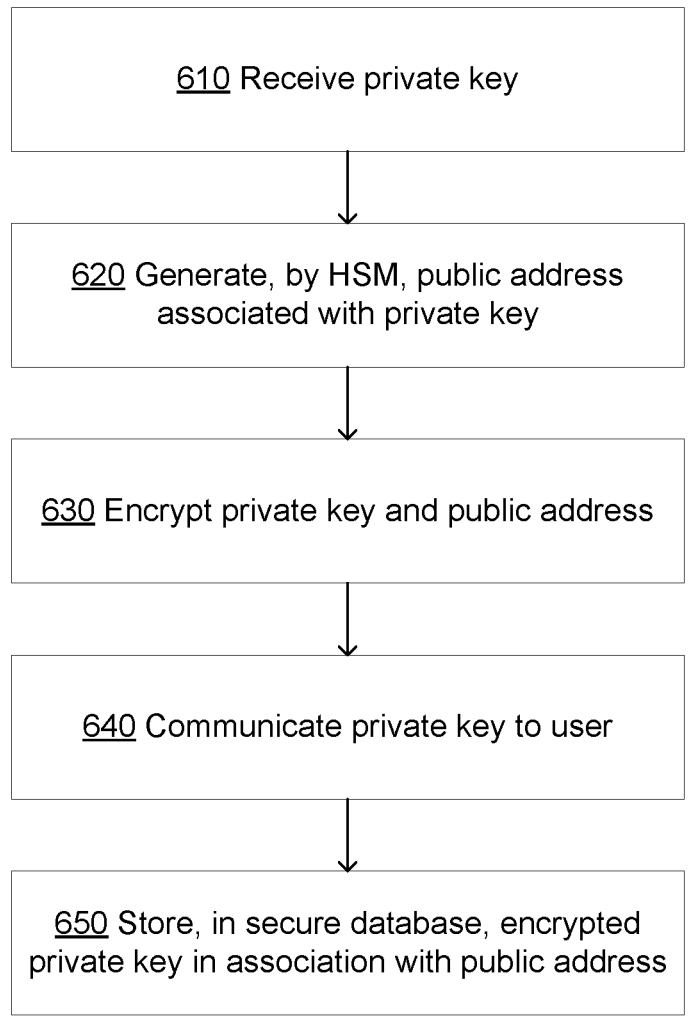
FIG. 6 depicts a flow diagram of one illustrative example of method of cryptographic key management, in accordance with one or more aspects of the present disclosure.

FIG. 6 depicts a flow diagram of one illustrative example of method 600 of cryptographic key management, in accordance with one or more aspects of the present disclosure. Method 600 and/or each of its individual functions, routines, subroutines, or operations may be performed by one or more general purpose or specialized computer systems (e.g., example computer system 1000 of FIG. 13). In some implementations, method 600 may be performed by a single processing thread. Alternatively, method 600 may be performed by two or more processing threads, each thread executing one or more individual functions, routines, subroutines, or operations of the method. In some implementations, the processing threads implementing method 600 may be synchronized (e.g., using semaphores, critical sections, and/or other thread synchronization mechanisms).

At block 610, the computer system implementing the method receives a private key associated with a user.

At block 620, the computer system causes an HSM to generate a public address by performing a cryptographic operation on the private key.

At block 630, the computer system encrypts the private key and the public address.

At block 640, the computer system communicates the private key to the user.

At block 650, the computer system stores, in a secure database, the encrypted private key in association with public address, and the method terminates.

Figure 7:
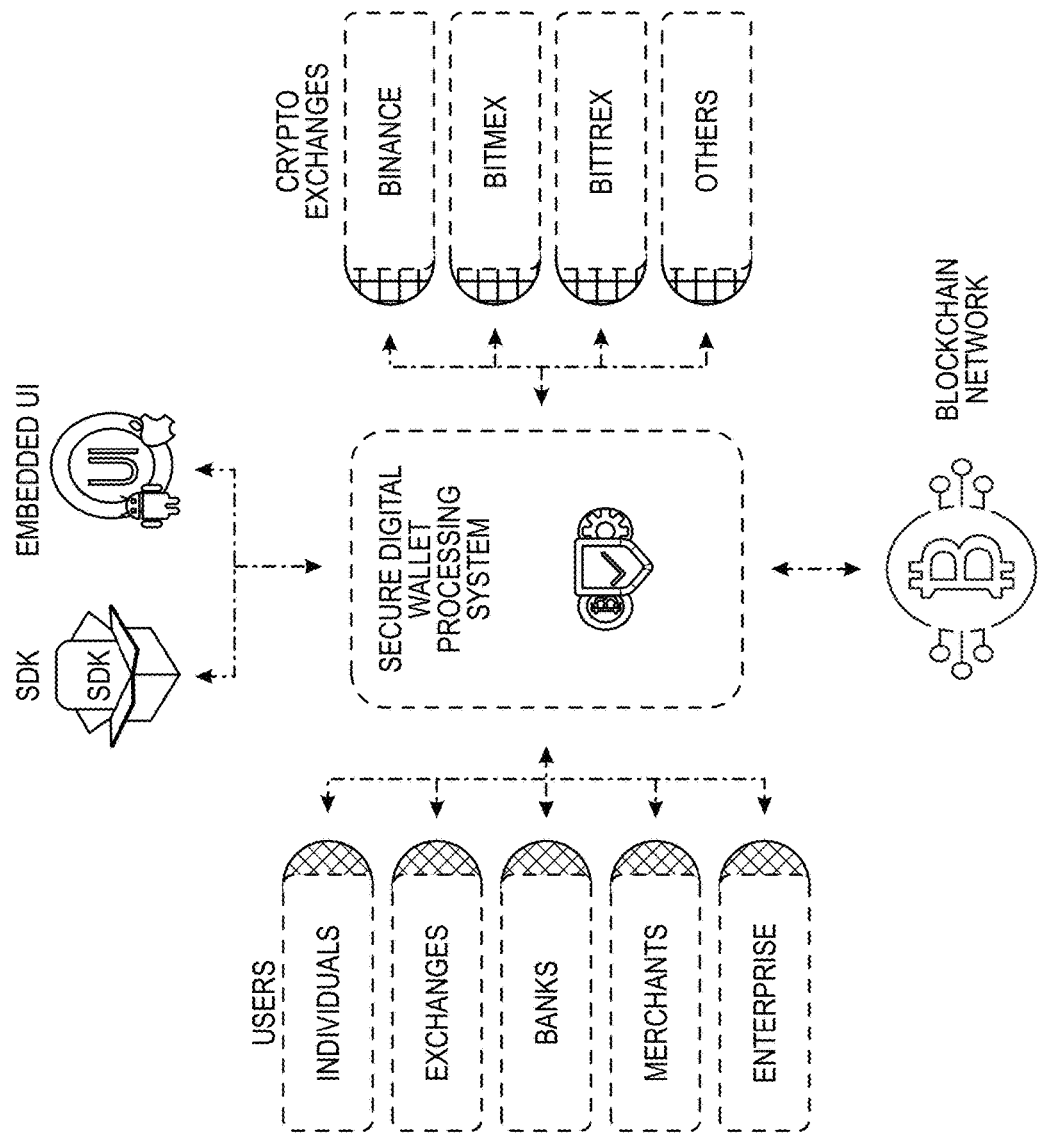
FIG. 7 depicts a high-level architecture of an example secure digital wallet processing system performing the functions described herein.

FIG. 7 depicts a high-level architecture of an example secure digital wallet processing system. As illustrated, the secure wallet processing system can communicate with a plurality of users, a software development kit (SDK), a blockchain network, and crypto exchanges.

Figure 8:
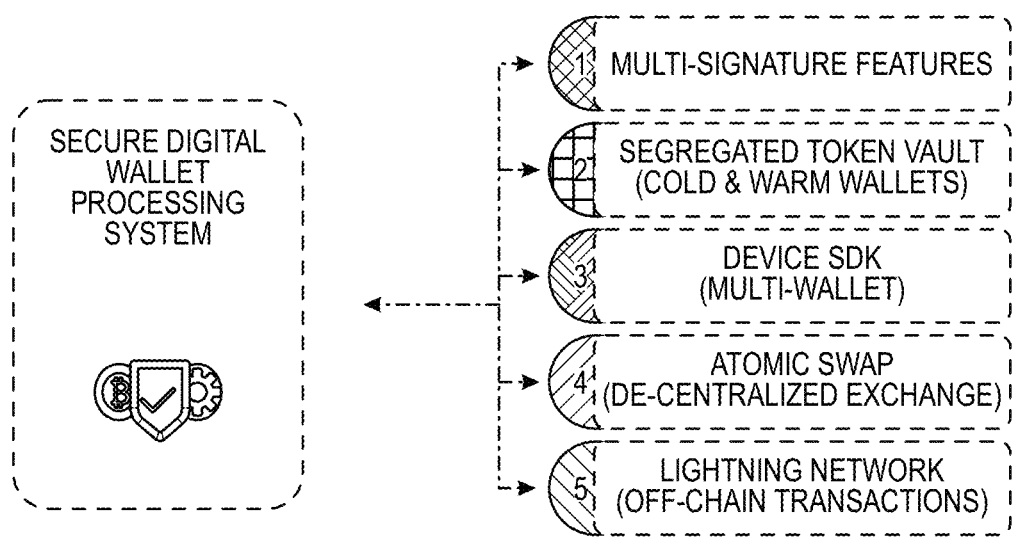
FIG. 8 depicts a high-level functional diagram of an example secure digital wallet processing system performing the functions described herein.

FIG. 8 depicts a high-level functional diagram of an example secure digital wallet processing system. As illustrated, the secure wallet processing system can support various features described herein, e.g., multi-signature, segregated wallets, SDK, de-centralized exchange, off-chain transactions.

Figure 9:
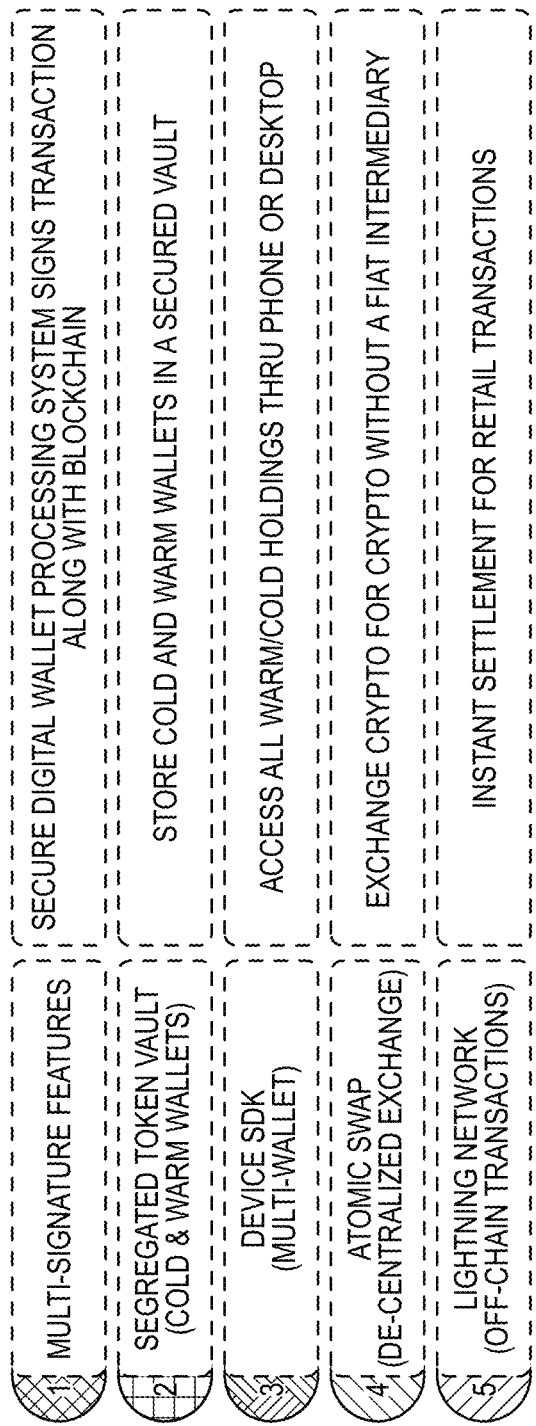
FIG. 9 depicts a high-level functional diagram of various subsystems of an example secure digital wallet processing system performing the functions described herein.

FIG. 9 depicts a high-level functional diagram of an example secure digital wallet processing system where the features illustrated in FIG. 8 are shown on the left-hand side and the functionalities associated with the features are shown on the right-hand side.

Figure 10:
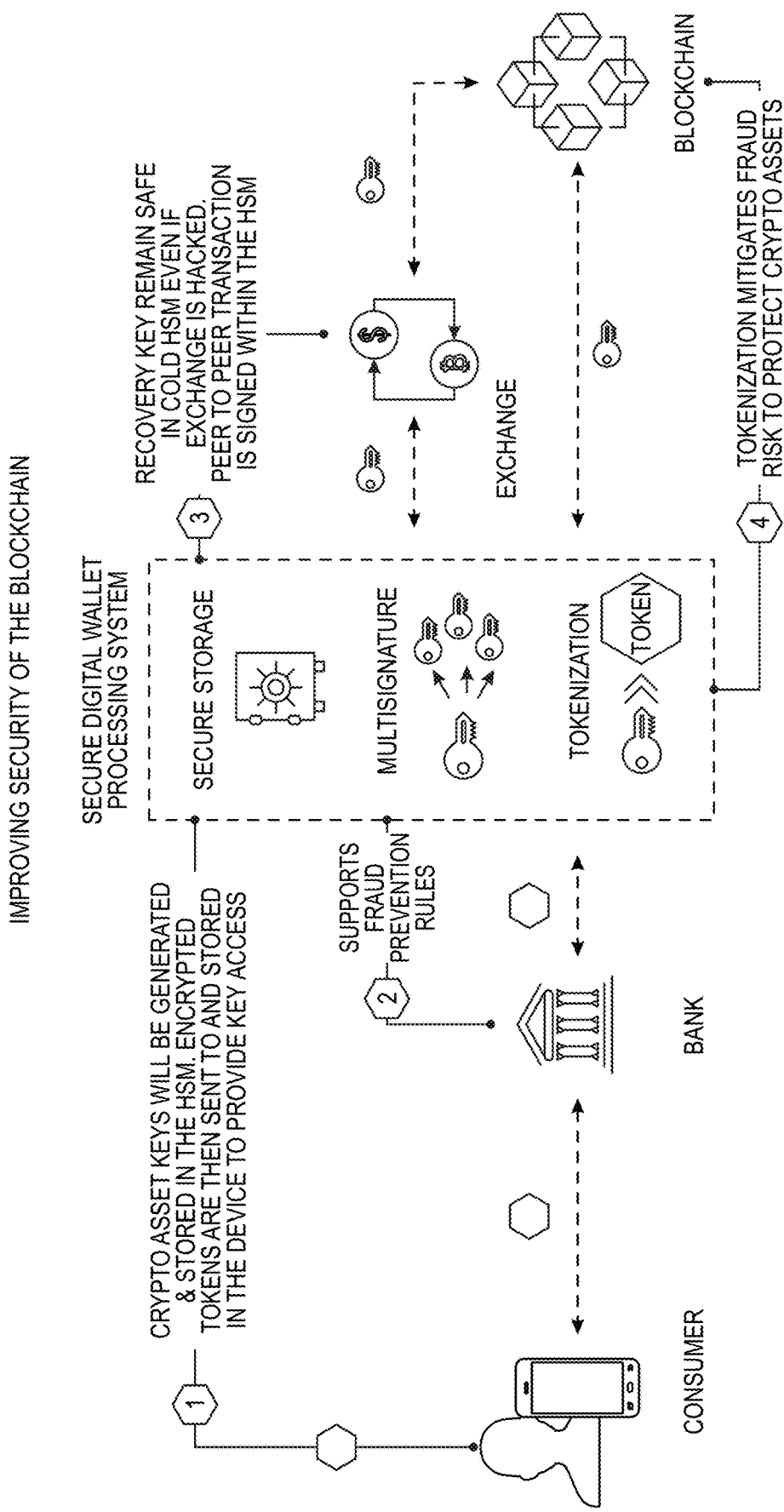
FIG. 10 depicts a high-level interaction diagram of an example secure digital wallet processing system performing the functions described herein.

FIG. 10 depicts a high-level interaction diagram of an example secure digital wallet processing system featuring a secure storage, multi-signature, and tokenization. The crypto asset keys are generated and stored in the HSM. Encrypted tokens are then sent to and stored in the device of a consumer to provide key access. A bank may support fraud prevention rules. Recovery keys remain safe in cold HSM even if exchange is hacked. Peer to peer transaction may be signed with the HSM. Tokenization mitigates fraud risk to protect crypto assets.

Figure 11:
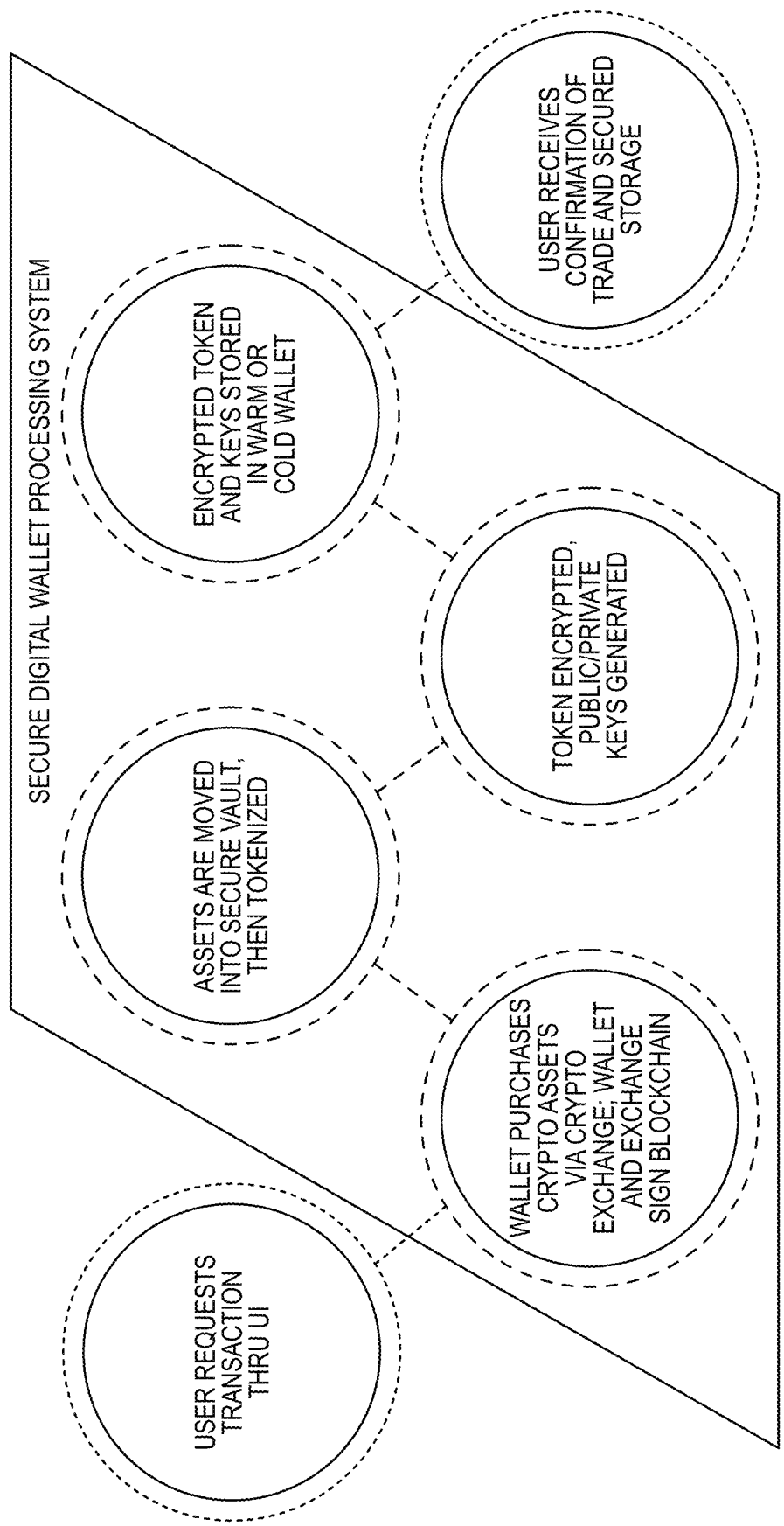
FIG. 11 depicts a buy order workflow performed by an example secure digital wallet processing system performing the functions described herein.

FIG. 11 depicts a buy order workflow performed by an example secure digital wallet processing system. User requests transaction through UI. Wallet purchases crypto assets via crypto exchange. Wallet and exchange sign blockchain. Assets are moved into secure vault, then tokenized. Token encrypted, public/private keys are generated. Encrypted token and the keys are stored in a warm or cold wallet. User receives confirmation of trade and secured storage.

Figure 12:
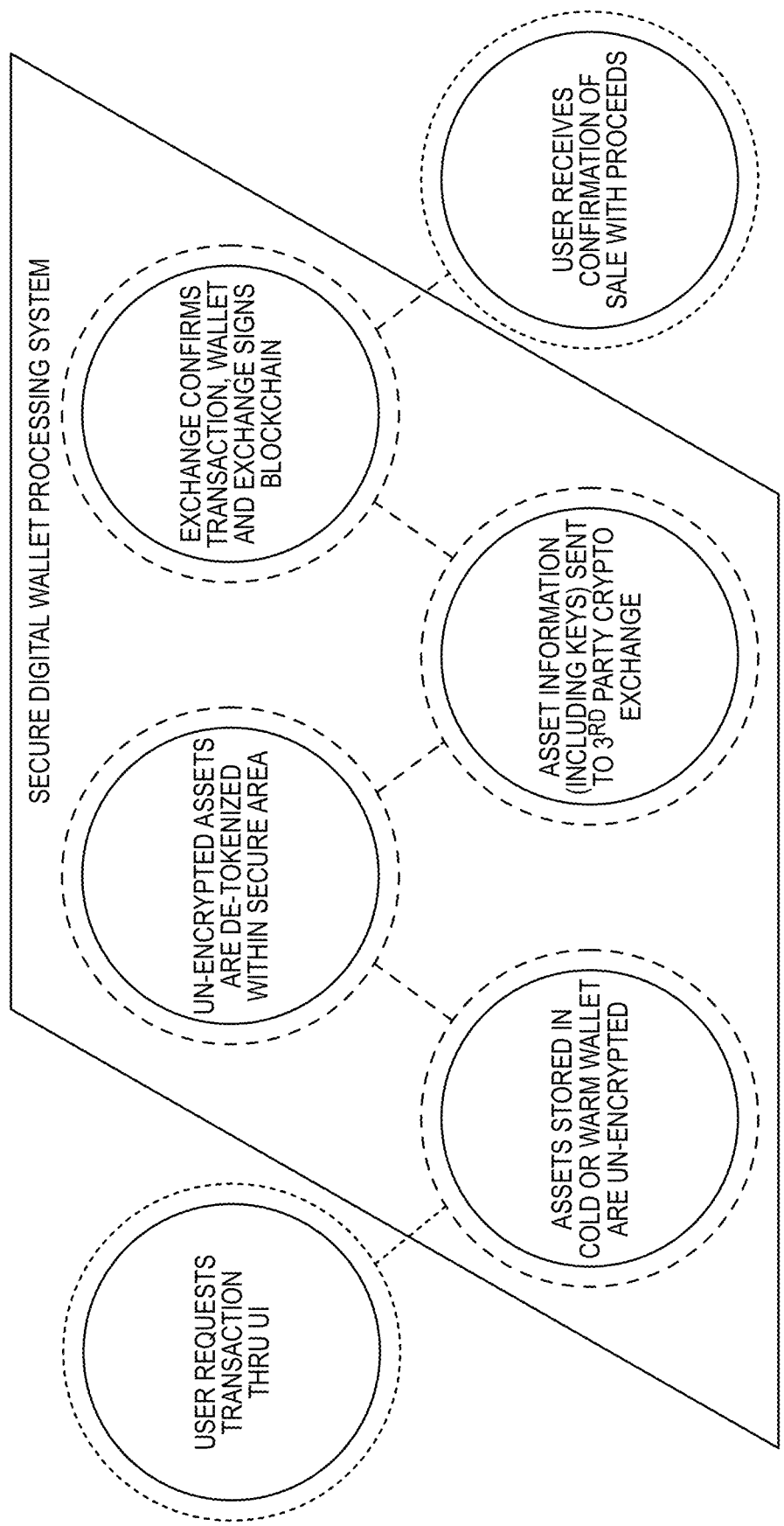
FIG. 12 depicts a sell order workflow performed by an example secure digital wallet processing system performing the functions described herein.

FIG. 12 depicts a sell order workflow performed by an example secure digital wallet processing system. User requests transaction through UI. Assets stored in a warm or cold wallet are un-encrypted. Un-encrypted assets are de-tokenized within secure area. Asset information (including keys) sent to third party crypto exchange. Exchange confirms transaction. Wallet and exchange sign blockchain. User receives confirmation of sale with proceeds.

Figure 13:
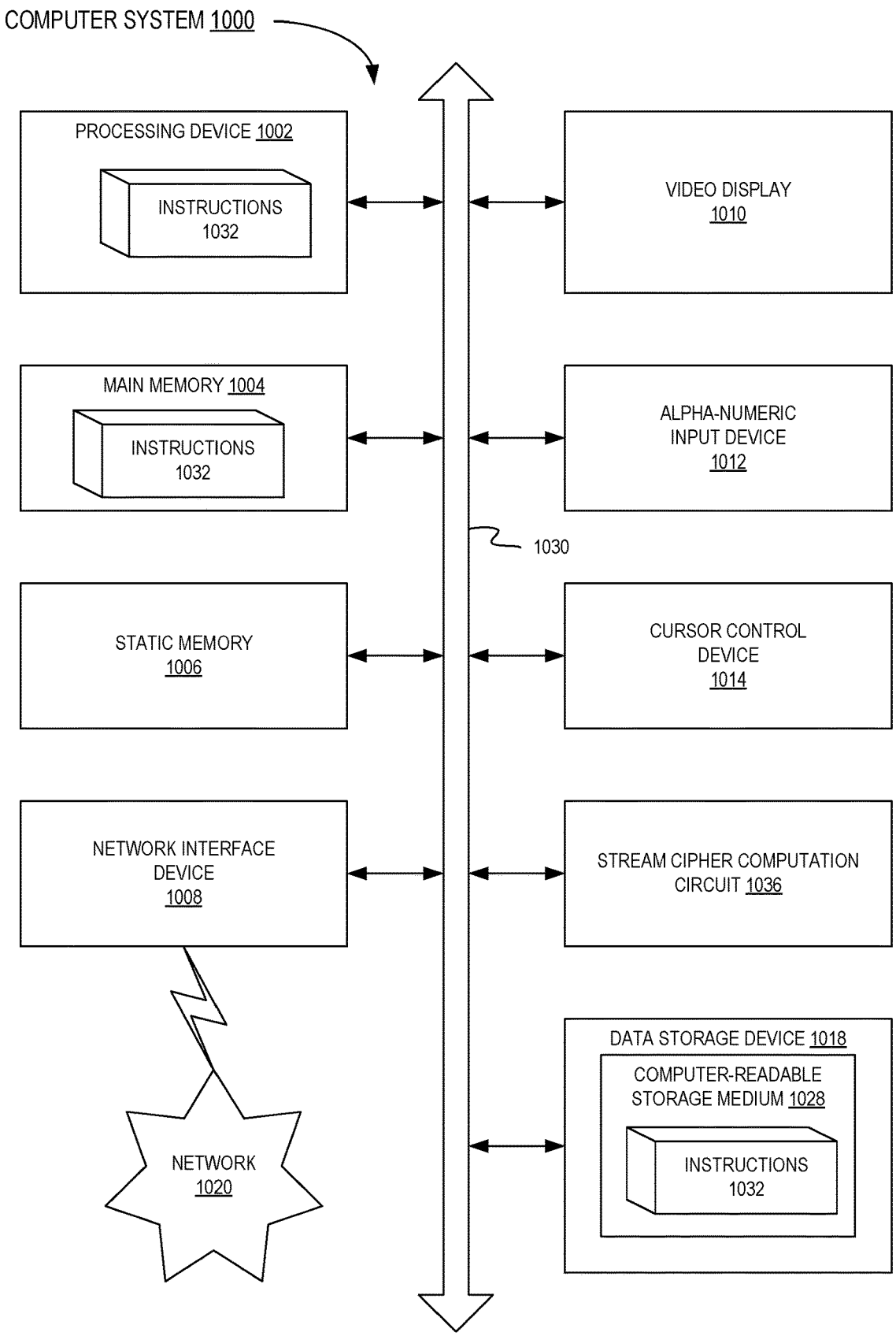
FIG. 13 schematically illustrates a diagrammatic representation of an example computing system which may perform the methods described herein.

FIG. 13 schematically illustrates a diagrammatic representation of a computing system 1000, within which a set of instructions, for causing the computing device to perform the methods described herein, may be executed. Computing system 1000 may be connected to other computing devices in a LAN, an intranet, an extranet, and/or the Internet. The computing device may operate in the capacity of a server machine in client-server network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods described herein.

The example computing system 1000 may include a processor (also referred to as "central processing unit" (CPU)) 1002, which in various illustrative examples may be a general purpose or specialized processor comprising one or more processing cores. The example computing system 1000 may further comprise a main memory 1004 (e.g., synchronous dynamic random access memory (DRAM), read-only memory (ROM)), a static memory 1006 (e.g., flash memory and a data storage device 1018), which may communicate with each other via a bus 1030. The processing device 1002 may be configured to execute methods for performing the operations and steps described herein.

The example computing system 1000 may further include a network interface device 1008 which may communicate with a network 1020. The example computing system 1000 also may include a video display unit 1010 (e.g., a liquid crystal display (LCD) or a cathode ray tube (CRT)), an alphanumeric input device 1012 (e.g., a keyboard), and a cursor control device 1014 (e.g., a mouse). In one embodiment, the video display unit 1010, the alphanumeric input device 1012, and the cursor control device 1014 may be combined into a single component or device (e.g., an LCD touch screen).

The data storage device 1018 may include a computer-readable storage medium 1028 on which may be stored one or more sets of instructions 1032 implementing any one or more of the methods or functions described herein, including method 500 of implementing a secure digital wallet and/or method 600 of cryptographic key management. Instructions 1032 implementing the methods or functions described herein may also reside, completely or at least partially, within the main memory 1004 and/or within the processing device 1002 during execution thereof by the example computing system 1000, hence the main memory 1004 and the processing device 1002 may also constitute or comprise computer-readable media. The instructions may further be transmitted or received over the network 1020 via the network interface device 1008.

While the computer-readable storage medium 1028 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "updating", "identifying", "determining", "sending", "assigning", or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc. as used herein are meant as labels to distinguish among different elements and may not necessarily have an ordinal meaning according to their numerical designation.

Examples described herein also relate to a system for performing the methods described herein. This system may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other system. Various general purpose systems may be used in accordance with the teachings described herein, or it may prove convenient to construct more specialized system to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

What is claimed is:

1. A computer-implemented method of a secure digital wallet processing system, the method comprising:

retrieving, by a hardware security module (HSM) of the secure digital wallet processing system from a cold storage included in the secure digital wallet processing system, a private key associated with a customer, wherein the secure digital wallet processing system further includes a warm storage;

generating, using the HSM, a public address associated for the customer from the private key, by performing by the HSM a cryptographic operation on the private key retrieved by the HSM from the cold storage, wherein the public address is not generated from a public key;

encrypting, by the HSM, the private key and the public address;

storing the encrypted public address in association with the encrypted private key in a key management system database of the secure digital wallet processing system;

receiving a distributed ledger transaction request including an authentication token and a customer identifier, the customer identifier being the public address associated with the customer;

validating the distributed ledger transaction request using the received public address by an authenticator that accesses a customer identifier public address database;

in response to the validating the distributed ledger transaction request, retrieving using the received public address, from the key management system database, the encrypted private key;

decrypting the encrypted private key;

signing, using the HSM, a distributed ledger transaction by the decrypted private key; and providing the signed distributed ledger transaction to a distributed ledger.

2. The method of claim 1, wherein the distributed ledger transaction is one of: a cryptocurrency buy order, a cryptocurrency sell order, a cryptocurrency transfer to another public address, or a code implementing a smart contract.

3. The method of claim 1, further comprising:

generating the public address and providing the public address to a user prior to receiving the distributed ledger transaction.

4. The method of claim 1, further comprising:

prior to the retrieving, storing the private key and a corresponding public key in the cold storage.

5. The method of claim 1, further comprising:

performing by the HSM the cryptographic operation on the private key in the warm storage.

6. A computer system, comprising:

a memory; and a processor coupled to the memory, wherein the memory comprises executable instructions which, when executed by the processor, cause the processor to perform a method including:

retrieving, by using a hardware security module (HSM) of the computer system from a cold storage included in the computer system, a private key associated with a customer, wherein the computer system further comprises a warm storage;

generating, by using the HSM, a public address associated or the customer, from the private key, by performing by the HSM a cryptographic operation on the private key retrieved by the HSM from the cold storage, wherein the public address is not generated from a public key;

encrypting, by using the HSM, the private key and the public address;

storing the encrypted public address in association with the encrypted private key in a key management system database of the computer system;

receiving a distributed ledger transaction request including an authentication token and a customer identifier, the customer identifier being the public address associated with the customer;

validating the distributed ledger transaction request using the received public address by an authenticator that accesses a customer identifier public address database;

in response to the validating the distributed ledger transaction request, retrieving using the received public address, from the key management system database, the encrypted private key;

decrypting the encrypted private key;

using the HSM to sign a distributed ledger transaction by the decrypted private key; and providing the signed distributed ledger transaction to a distributed ledger.

7. The computer system of claim 6, wherein the distributed ledger transaction is one of: a cryptocurrency buy order, a cryptocurrency sell order, a cryptocurrency transfer to another public address, or a code implementing a smart contract.

8. The computer system of claim 6, wherein the method further includes:

generate the public address and providing the public address to a user prior to receiving the distributed ledger transaction.

9. The computer system of claim 6, wherein the HSM is included in a key management system of the computer system, the key management system further including at least one of: a warm storage device or a cold storage device.

10. A non-transitory computer-readable storage medium comprising executable instructions that, when executed by a processor of a secure digital wallet processing system, cause the processor to perform a method including:

retrieving, by using a hardware security module (HSM) of the secure digital wallet processing system from a cold storage included in the secure digital wallet processing system, a private key associated with a customer, wherein the secure digital wallet processing system further includes a warm storage;

generating, by using the HSM, a public address associated or the customer, from the private key, by performing by the HSM a cryptographic operation on the private key retrieved by the HSM from the cold storage, wherein the public address is not generated from a public key;

encrypting, by using the HSM, the private key and the public address;

storing the encrypted public address in association with the encrypted private key in a key management system database of the secure digital wallet processing system;

receiving a distributed ledger transaction request including an authentication token and a customer identifier, the customer identifier being the public address associated with the customer;

validating the distributed ledger transaction request using the received public address by an authenticator that accesses a customer identifier public address database;

in response to the validating the distributed ledger transaction request, retrieving using the received public address, from the key management system database, the encrypted private key;

decrypting the encrypted private key;

using the HSM to sign a distributed ledger transaction by the decrypted private key; and providing the signed distributed ledger transaction to a distributed ledger.

11. The non-transitory computer-readable storage medium of claim 10, wherein the distributed ledger transaction is one of: a cryptocurrency buy order, a cryptocurrency sell order, a cryptocurrency transfer to another public address, or a code implementing a smart contract.

12. The non-transitory computer-readable storage medium of claim 10, wherein the method further includes:

generate the public address and providing the public address to a user prior to receiving the distributed ledger transaction.

\* \* \* \* \*

UNITED STATES PATENT AND TRADEMARK OFFICE
CERTIFICATE OF CORRECTION

PATENT NO. : 12,307,439 B2  
APPLICATION NO. : 17/285249  
DATED : May 20, 2025  
INVENTOR(S) : Sercan Karaoglu and Mohammed Chakib Bouda Page 1 of 1

It is certified that error appears in the above-identified patent and that said Letters Patent is hereby corrected as shown below:

In the Claims

In Claim 6, Column 11, Line 43, please remove "or the customer," and insert -- for the customer --

In Claim 10, Column 12, Lines 30, please remove "or the customer," and insert -- for the customer --

Signed and Sealed this  
Nineteenth Day of August, 2025

Coke Morgan Stewart  
*Acting Director of the United States Patent and Trademark Office*